United States Patent
Zemke et al.

(10) Patent No.: US 7,733,061 B2
(45) Date of Patent: Jun. 8, 2010

(54) CURRENT CONTROL CIRCUITRY AND METHODOLOGY FOR CONTROLLING CURRENT FROM CURRENT CONSTRAINED SOURCE

(75) Inventors: Roger A. Zemke, Londonderry, NH (US); David B. Bell, Milpitas, CA (US); Samuel Nork, Andover, MA (US); Trevor Barcelo, Andover, MA (US)

(73) Assignee: Linear Technology Corporation, Milpitas, CA (US)

( * ) Notice: Subject to any disclaimer, the term of this patent is extended or adjusted under 35 U.S.C. 154(b) by 473 days.

(21) Appl. No.: 11/024,032

(22) Filed: Dec. 29, 2004

(65) Prior Publication Data

US 2006/0139002 A1    Jun. 29, 2006

(51) Int. Cl.
*H02J 7/00* (2006.01)
*H02J 7/06* (2006.01)

(52) U.S. Cl. .................. 320/128; 320/135; 320/138; 320/163; 307/66

(58) Field of Classification Search ............... 320/128, 320/138, 163
See application file for complete search history.

(56) References Cited

U.S. PATENT DOCUMENTS

| | | | |
|---|---|---|---|
| 5,402,055 A * | 3/1995 | Nguyen | 320/160 |
| 5,625,275 A | 4/1997 | Tanikawa et al. | |
| 5,723,970 A | 3/1998 | Bell | |
| 5,994,876 A * | 11/1999 | Canny et al. | 320/132 |
| 6,157,173 A | 12/2000 | Baranowski et al. | |
| 6,300,744 B1 | 10/2001 | Shum | |
| 6,404,251 B1 | 6/2002 | Dwelley et al. | |
| 6,507,172 B2 | 1/2003 | Sherman | |
| 6,522,118 B1 | 2/2003 | Barcelo et al. | |
| 6,583,603 B1 | 6/2003 | Baldwin | |
| 6,861,824 B1 | 3/2005 | Liu et al. | |
| 2005/0242786 A1 | 11/2005 | Sawyers et al. | |
| 2005/0253560 A1 | 11/2005 | Popescu-Stanesti et al. | |
| 2007/0103118 A1 | 5/2007 | Takagi et al. | |

FOREIGN PATENT DOCUMENTS

| | | |
|---|---|---|
| JP | 2000-324714 | 11/2000 |
| JP | 2002-237971 | 8/2002 |
| JP | 2004-151908 | 5/2004 |

OTHER PUBLICATIONS

LTC4413; LT/TP 1104 1K; "Dual 2.6A, 2.5V to 5.5V, Ideal Diodes in 3mm x3mm DFN"; Linear Technology Corporation; c. 2004; pp. 1-12; USA.
Japanese Office Action issued in Japanese Patent Application No. JP 2005-377229, mailed Mar. 24, 2009.
Garmin International, Inc. Non-Disclosure Agreement.
Research in Motion Limited (RIM) Non-Disclosure Agreement.
Apple Non-Disclosure Agreement.

* cited by examiner

*Primary Examiner*—Edward Tso
*Assistant Examiner*—Yalkew Fantu
(74) *Attorney, Agent, or Firm*—McDermott Will & Emery LLP

(57) ABSTRACT

Current control circuitry for controlling current supplied from a source, that may be a current-constrained source, to a load and a battery. A current limit control circuit limits current supplied by the source to the load in accord with a programmed current limit. Load current is measured, and an input charger control circuit controls magnitude of current to the battery based on the difference between measured load current and battery current programmed to be supplied to the battery, such that the sum of load current and battery current is maintained within the programmed current limit.

13 Claims, 4 Drawing Sheets

US 7,733,061 B2

CURRENT CONTROL CIRCUITRY AND METHODOLOGY FOR CONTROLLING CURRENT FROM CURRENT CONSTRAINED SOURCE

TECHNICAL FIELD

This disclosure is related generally to current control circuitry and methodology for controlling current to be supplied from a current constrained source to a load and a battery. Specifically, the disclosure relates to current control circuitry and methodology for controlling battery charge current based on load current such that total current drawn from the source is maintained within a predetermined limit.

BACKGROUND

Rechargeable batteries are commonly used to power portable electronic devices, such as laptop computers, PDAs, digital cameras and MP3 players. Many of those portable electronic devices include circuitry for charging their batteries whenever the devices are connected to external power sources such as a wall adapter, USB, Firewire, and Ethernet. For example, the USB itself can be used to directly power the devices and charge their batteries. According to the USB specification, USB hosts, or USB powered hubs, provide as much as 500 mA from their nominal 5V supply. The USB is known as a current constrained source.

FIG. 1 is a schematic diagram showing circuit topology for providing power to a load and charging a battery, incorporated into a portable USB device. As shown in FIG. 1, a USB linear charger 2 generally provides current constrained power directly to a battery 4 to which a system load 6 is tied in parallel with battery 4. This topology maintains the USB current constraint but sacrifices efficiency in that there is a substantial voltage drop from a USB input voltage to a battery voltage. Since load 6 is tied directly to battery 4, if the battery voltage is very low or battery 4 is dead, there will not be enough voltage applied to load 6 to run an application. The voltage input to system load 6 is the battery voltage and the current drawn by system load 6 is equal to the power requirement of load 6 divided by the battery voltage. This is true even if there is external power applied to load 6 and battery 4 because the battery dictates the voltage applied to load 6. When battery 4 is fully discharged, several minutes of charging may be required before any load can be connected to the battery. Moreover, many battery or handheld applications have peak current that can exceed the 500 mA USB specification. Input current from the current constrained source to USB linear charger 2 needs to be controlled properly when peak current of load 6 exceeds the USB specification.

The subject matter described herein addresses, but is not limited to, the above shortcomings.

SUMMARY

The disclosure describes current control circuitry and methodology for controlling current supplied from a source to a load and a battery. In one aspect, a current limit to limit current to the load from the source may be programmed (preset). The load current is preferably measured, and magnitude of current to the battery may be controlled based on difference between the measured load current and the battery current programmed to be supplied to the battery so that the sum of the load current and the battery current is within the programmed current limit. In another aspect, magnitude of current to the battery is controlled as a function of the measured load current so that the sum of the load current and the battery current is within the programmed current limit.

In one embodiment, the source is a current constrained source, and the programmed current limit is determined according to the capacity of the current constrained source to supply current. For example, the source may be a universal serial bus (USB) power supply, and the load and battery may constitute a USB powered device.

In another embodiment, load and battery voltages are preferably monitored. When the load voltage drops below the battery voltage, the battery may provide current to the load.

In yet another embodiment, presence of an additional source for supplying current to the load and battery may be detected. When the presence of the additional source is detected, the load current and the battery current from the source are turned off for allowing the additional source to supply the current to the load and battery. The additional source may be connected to the load, from which power is provided to the battery.

In still another embodiment, there is a circuit path interconnecting the source and load, and the battery is connected to the circuit path through a circuit for controlling battery charge current to prevent a battery voltage from dictating voltage on the circuit path.

When the source is a current constrained source, magnitude of the battery charge current may be controlled based on the measured load current so that the sum of the load current and the battery current is within the programmed current limit. When the source is not current constrained, the battery charge current of magnitude equivalent to the programmed magnitude is provided to the battery.

Additional aspects and advantages of the present disclosure will become readily apparent to those skilled in the art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

DESCRIPTION OF THE DRAWINGS

Examples of the subject matter claimed herein are illustrated in the figures of the accompanying drawings and in which reference numerals refer to similar elements and in which:

DETAILED DESCRIPTION

Figure 2:
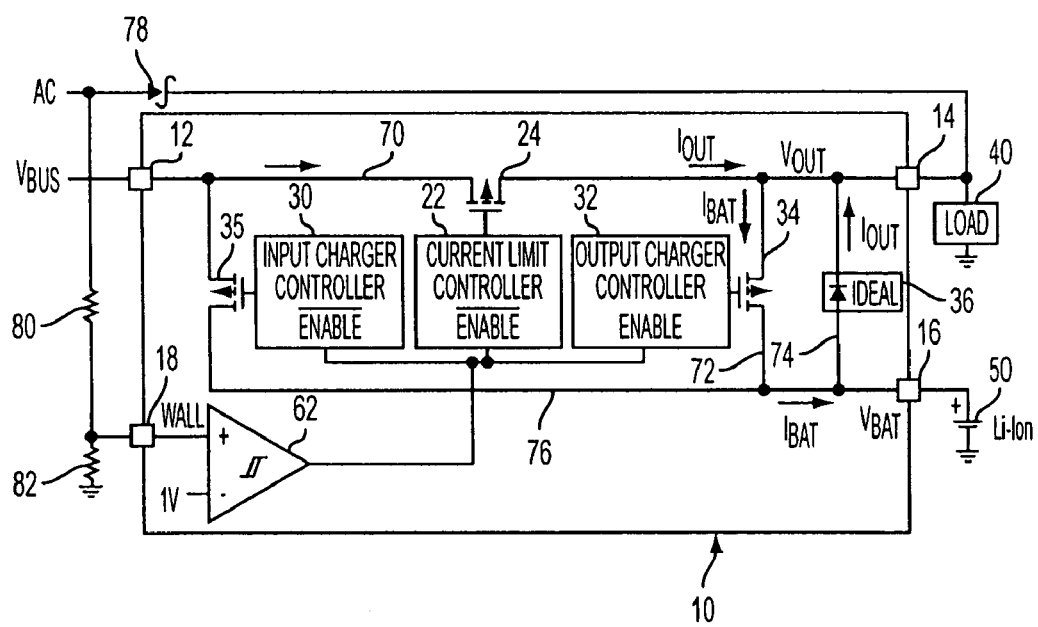
FIG. 2 is an exemplary configuration of current control circuitry according to one embodiment of the disclosure.

FIG. 2 shows one embodiment of current control circuitry for controlling current from a current constrained source to a load and a battery. This embodiment relates to an integrated battery charger and power manger that provides a battery powered application from a current constrained source. The idea is to maximize battery charge current in the presence of an application load powered from such a current constrained source. Basic operation designed in this embodiment is preferably to maintain current from the current constrained source constant and settable. In addition, this embodiment allows operation of an application load in the presence of a low or dead battery.

Figure 1:
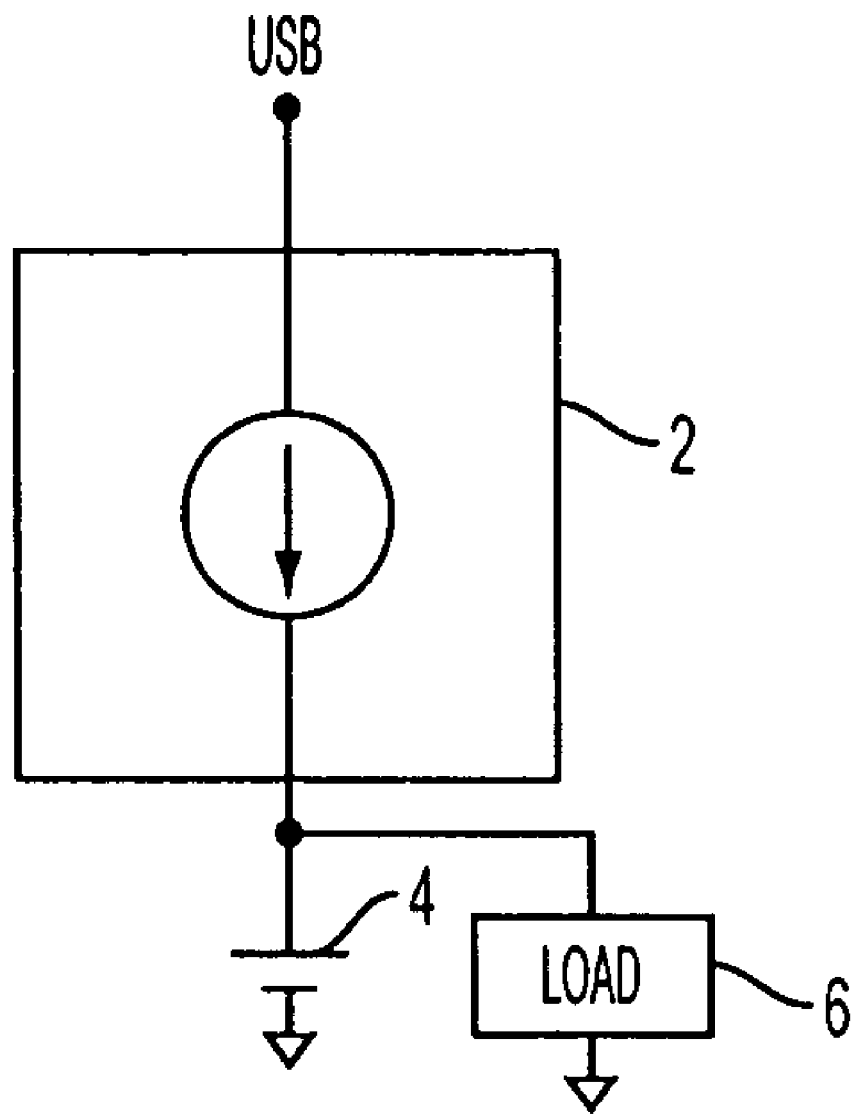
FIG. 1 is an example of a schematic circuit topology for providing power to a load and charging a battery, incorporated into a portable USB device.

In this embodiment, the current constrained source may be a USB. Current control circuitry 10 shown in FIG. 1 serves, but is not limited to serving, as a USB power manager and Li-Ion battery charger designed to work in portable battery-powered USB applications. Current control circuitry 10 may be formed on a single chip and incorporated into those portable battery-powered applications.

Current control circuitry 10 may be configured to steer a load 40 to an available source of power, and charge battery 50 with any available leftover current from the current constrained source. In this embodiment, a USB ($V_{BUS}$), a wall adaptor AC and battery 50 can be sources of power available to load 40. When the USB is present, circuitry 10 connects USB power directly to load 40 through circuit path 70. When both the USB and wall adapter AC are present, the circuitry may select wall adapter AC to supercede the USB as the source of power. These direct connections to load 40 translate to higher load voltages and greater efficiency, discussed below.

USB hosts, or USB powered hubs, provide as much as 500 mA from their nominal 5V supply. To run load 40 at as high an input voltage as possible minimizes current draw from the circuit path 70—leaving more current for battery charging. Current control circuitry 10 in this embodiment has a topology that switches battery 50 out of circuit path 70 when it is not needed, e.g., while battery 50 is being charged, when battery voltage is low, or when battery 50 is dead or missing. The greater efficiency of running load 40 at the USB supply voltage (instead of the battery voltage, see FIG. 1) means there is more current left in the 500 mA USB budget for charging battery 50. Because battery 50 is not in circuit path 70 whereas load 40 is tied to the USB or wall adapter AC, load 40 can be powered even if battery 50 is low or dead. The same reasoning applies for a fully charged battery 50. Even fully charged battery 50 is not in circuit path 70 unless the USB or the wall adapter is removed, as explained below (an ideal diode function).

Current control circuitry 10 implements a unique current control scheme that maintains the USB current limited while charging a battery under varying load conditions. In this current control scheme, current control circuitry 10 monitors current to load 40, and in response, increases or decreases current for battery charging to maintain input current to circuitry 10 within the USB current limited.

Referring to FIG. 2, current control circuitry 10 may include an input terminal 12, connected to a USB supply $V_{BUS}$ providing constrained current to terminal 12. An output terminal 14 is used to provide controlled power to load 40 from either USB supply $V_{BUS}$ or battery 16 when the USB supply is not present. Output terminal 14 can also be used as an input for charging battery 50 when the USB supply is not present, but power from wall adapter AC is applied to the terminal through a unidirectional current device such as a Schottkey diode 78. Input terminal 12 and output terminal 14 are interconnected by circuit path 70. Input terminal 12 and a battery terminal 16 to which battery 50 is connected, is interconnected by a circuit path 76. Battery terminal 16 can be used as an output when charging battery 50 and as an input when supplying battery power to output terminal 14. One example of battery 50 is a Li-ion battery.

Current control circuitry 10 includes a current limit controller 22 including an FET 24 provided between input terminal 12 and output terminal 14. Current limit controller 22 may be configured for controlling FET 24 in order to limit output current $I_{OUT}$ to load 40 within an input current limit $I_{CL}$. Input current limit $I_{CL}$ may be programmed by, for example, an external resistor (not shown). For example, input current limit $I_{CL}$ may be set to 500 mA according to the USB standard. In this example, current limit controller 22 can limit output current $I_{OUT}$ for load 40 to 500 mA. Current limit controller 22 preferably includes, or is coupled to, a current measurement unit (not shown in FIG. 2, but see FIG. 4) for measuring output current $I_{OUT}$ (sensing output current $I_{OUT}$) to use measured (sensed) current to limit output current $I_{OUT}$ within current limit $I_{CL}$.

Current control circuitry 10 also includes an input charger controller 30 which can switch battery 50 out of a path from USB supply $V_{BUS}$. Accordingly, battery 50 does not dictate a voltage on circuit path 70 (see FIG. 1). Input charger controller 30 may be coupled to current limit controller 22 to receive the measured output current $I_{OUT}$ on circuit path 70. In response, input charger controller 30 controls an FET 35, connected between input terminal 12b and battery terminal 16, to increase or decrease magnitude of battery charge current $I_{BAT}$ to charge battery 50. In this embodiment, input charger controller 30 controls battery charge current $I_{BAT}$ based on a difference between measured output current $I_{OUT}$ and battery current $I_{BAT}$ programmed to be supplied to battery 50. Battery charge current $I_{BAT}$ is controlled such that the sum of output current $I_{OUT}$ and battery charge current $I_{BAT}$ (total current $I_{OUT}+I_{BAT}$) is maintained within input current limit $I_{CL}$. In short, when charging from USB supply $V_{BUS}$, the battery charge current $I_{BAT}$ will wind up being the lesser of the programmed current limit $I_{CL}$ or the programmed charge current. Therefore the input current limit will never be exceeded.

Current control circuitry 10 further includes an ideal diode 36, implementation of which is well known, for example in commercially available LTC 4413 dual ideal diode integrated circuit, manufactured by Linear Technology Corporation, and described in its corresponding datasheet, incorporated herein by reference. When output voltage $V_{OUT}$ drops below battery voltage $V_{BAT}$, ideal diode 36 will then start conducting and prevent output voltage $V_{OUT}$ from dropping below battery voltage $V_{BAT}$ through circuit path 74. Ideal diode 36 also prevents reverse conduction from load 40 to battery 50 when output voltage $V_{OUT}$ is greater than battery voltage $V_{BAT}$. The advantage of powering load 40 through ideal diode 36 (rather than connecting the load directly to the battery) is that when USB power source $V_{BUS}$ (or wall adaptor AC) is present and the battery is fully charged, the battery remains fully charged until output voltage $V_{OUT}$ drops below battery voltage $V_{BAT}$.

In addition, there is an hysteretic comparator 62 for detecting presence of an external power source, such as wall adapter AC, through resistors 80 and 82. The positive input of comparator 62 is connected to wall adapter AC through a wall terminal 18, and is applied with a voltage divided by resistors 80 and 82. Comparator 62 compares the divided voltage with a voltage of 1V (for this example) applied to its negative input. If the divided voltage is greater than 1V the output of comparator 62 will then be logic high, resulting in detection of the presence of wall adapter AC.

According to FIG. 2, wall adapter AC can be connected to load 40 to supply current to the load 40 and battery 50. To charge battery 50 from wall adapter AC, an output charger controller 32 is preferably provided to connect output terminal 14 and battery terminal 16 through circuit path 72. When the presence of wall adapter AC is detected, output charger controller 32 is activated to control an FET 34 to connect output terminal 14 and battery terminal 16, which allows wall adapter AC to supply power to battery 50 as well as load 40. When presence of wall adapter AC is detected, current limit controller 22 and input charger controller 30 are, on the other hand, disabled to prevent reverse conduction from output terminal 14 to input terminal 12 and from battery terminal 16 to input terminal 12, respectively.

It is noted that FET 34 may be used to achieve an ideal diode function to provide power from battery 50 to load 40. In other words, output charger controller 32 may be configured for monitoring output voltage $V_{OUT}$ and battery voltage $V_{BAT}$, and controlling FET 34 to connect output terminal 14 and battery terminal 16 to supply power to load 14 from battery 16 when output voltage $V_{OUT}$ drops below battery voltage $V_{BAT}$.

In operation, current control circuitry 10 enables simultaneous powering of load 40 and charging of battery 50 from USB supply $V_{BUS}$ with input current limit $I_{CL}$ limited by current limit controller 22. Current limit controller 22 measures output current $I_{OUT}$. If output current $I_{OUT}$ exceeds current limit $I_{CL}$, current limit controller 22 then controls FET 24 to limit output current $I_{OUT}$ within current limit $I_{CL}$. With such current limit operation, output voltage $V_{OUT}$ will drop. When output voltage $V_{OUT}$ drops below battery voltage $V_{BAT}$, ideal diode 36 then starts conducting power from battery 50 to load 40 to prevent output voltage $V_{OUT}$ from dropping below the battery voltage.

Input charger controller 30 receives measured output current $I_{OUT}$ from current limit controller 22 and obtains the difference between the measured output current and battery charge current programmed to be supplied to battery 50. Based on the difference obtained, input charger controller 30 may control battery current $I_{BAT}$. According to magnitude of measured current $I_{OUT}$, input charger controller 30 increases or decreases battery charge current $I_{BAT}$, provided that the total current $I_{OUT}$ and $I_{BAT}$ does not exceed current limit $I_{CL}$.

Assume for this example that current limit $I_{CL}$ is 500 mA, and programmed battery charge current 500 mA. When output current $I_{OUT}$ to load 40 measured is 200 mA, charge current $I_{BAT}$ becomes 300 mA. When output current $I_{OUT}$ to load 40 measured is 500 mA, charge current IBAT becomes zero so that the sum of output current $I_{OUT}$ and charge current $I_{BAT}$ does not exceed current limit $I_{CL}$ of 500 mA. On the other hand, output current $I_{OUT}$ to load 40 measured is zero, maximum 500 mA charge current IBAT is available.

When wall adaptor AC is connected to the USB device, input charger controller 30 and current limit controller 22 are disabled, while output charger controller is enabled to provide power from wall adaptor AC to battery 16 from output terminal 14. At this time, output terminal 14 serves as an input terminal for battery 50. Therefore, power is supplied to battery 50 through output terminal 14 and circuit path 72 for charging battery 50. Further, since input charger controller 30 and current limit controller 22 are disabled, there is no reverse conduction path back from output terminal 14 to input terminal 12 through FETs 24 and 35.

When input power, such as USB supply $V_{BUS}$ or wall adapter AC, is removed from the USB device, output voltage $V_{OUT}$ will drop below battery voltage $V_{BAT}$. Then, ideal diode 36 is activated and the forward conduction of the diode prevents output voltage $V_{OUT}$ from dropping below battery voltage $V_{BAT}$. Accordingly, power is supplied to load 40 from battery 50 when USB supply $V_{BUS}$ and wall adapter AC are not available.

In the following, another embodiment of current control circuitry will be described. In this embodiment, input current to the circuitry is maintained limited, programmable and independent of programmed charge current. The circuitry in this embodiment can be configured for controlling input current to the circuitry as a function of output current $I_{OUT}$.

Figure 3:
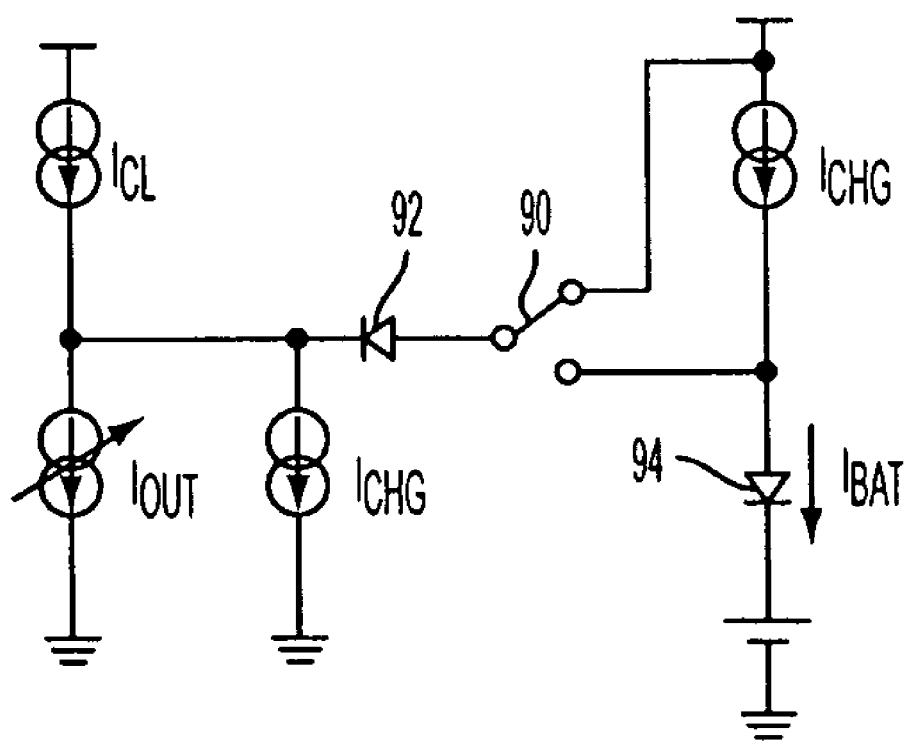
FIG. 3 is a schematic diagram of explaining current control according to another embodiment of the disclosure.

FIG. 3 is a high level schematic diagram for explaining exemplary current control according to this embodiment (the configuration shown in FIG. 3 may be used for coupling and programming between current limit controller 22 and input charger controller 30 of FIG. 2). Current limit is programmed based on a limit required at the current constrained source (current limit $I_{CL}$ in FIG. 3). Battery charge current is also programmed based on the battery rate or desired maximum charge rate (programmed battery charge current $I_{CHG}$ in FIG. 3). Programmed current limit $I_{CL}$ is allowed to act as a current limit for current from a current constrained source independent of programmed charge current $I_{CHG}$ for battery charge current. Programmed battery charge current $I_{CHG}$ takes over when the current control circuitry is powered from an external power source like wall adaptor AC.

When wall adaptor AC is not present and power is supplied from, for example, a USB current constrained source, a switch 90 connects the anode of a diode 92 to the anode of a diode 94. Actual battery charge current $I_{BAT}$ is equal to ($I_{CL}-I_{OUT}$) when ($I_{CL}-I_{OUT}$) is less than programmed battery charge current $I_{CHG}$. On the other hand, when ($I_{CL}-I_{OUT}$) is not less than programmed battery charge current $I_{CHG}$, actual battery charge current $I_{BAT}$ is equal to programmed battery charge current $I_{CHG}$. However, even when output current $I_{OUT}$ to a load is zero, actual battery charge current $I_{BAT}$ can never be greater than current limit $I_{CL}$ (even if programmed battery charge current $I_{CHG}$ is greater than current limit $I_{CL}$ in magnitude).

Since the sum of output current $I_{OUT}$ and actual battery charge current $I_{BAT}$ is equal to or less than input current from the USB current constrained source to meet the USB standard, and battery charge current $I_{BAT}$ is equal to current limit $I_{CL}$ minus output current $I_{OUT}$, input current from the current constrained source equals to current limit $I_{CL}$. When wall adaptor AC is present, switch 90 disconnects the anode of diode 92 from the anode of diode 94 and actual battery charge current $I_{BAT}$ becomes equal to programmed battery charge current $I_{CHG}$, even though programmed battery charge current $I_{CHG}$ is greater than current limit $I_{CL}$. Because wall adaptor AC has more power than the USB current constrained source, current limit ICL is no longer necessary and is taken over by programmed battery charge current $I_{CHG}$, as mentioned above.

The current control shown in FIG. 3 allows for independent control of battery charge current and input current limiting. This independent control of charge current and input current limiting gives the current control circuitry the ability to charge from two independent sources (e.g., USB current constrained source and wall adapter) at different current levels without changing programming resistors on the fly to set current limit $I_{CL}$ and battery charge current $I_{CHG}$.

Figure 4:
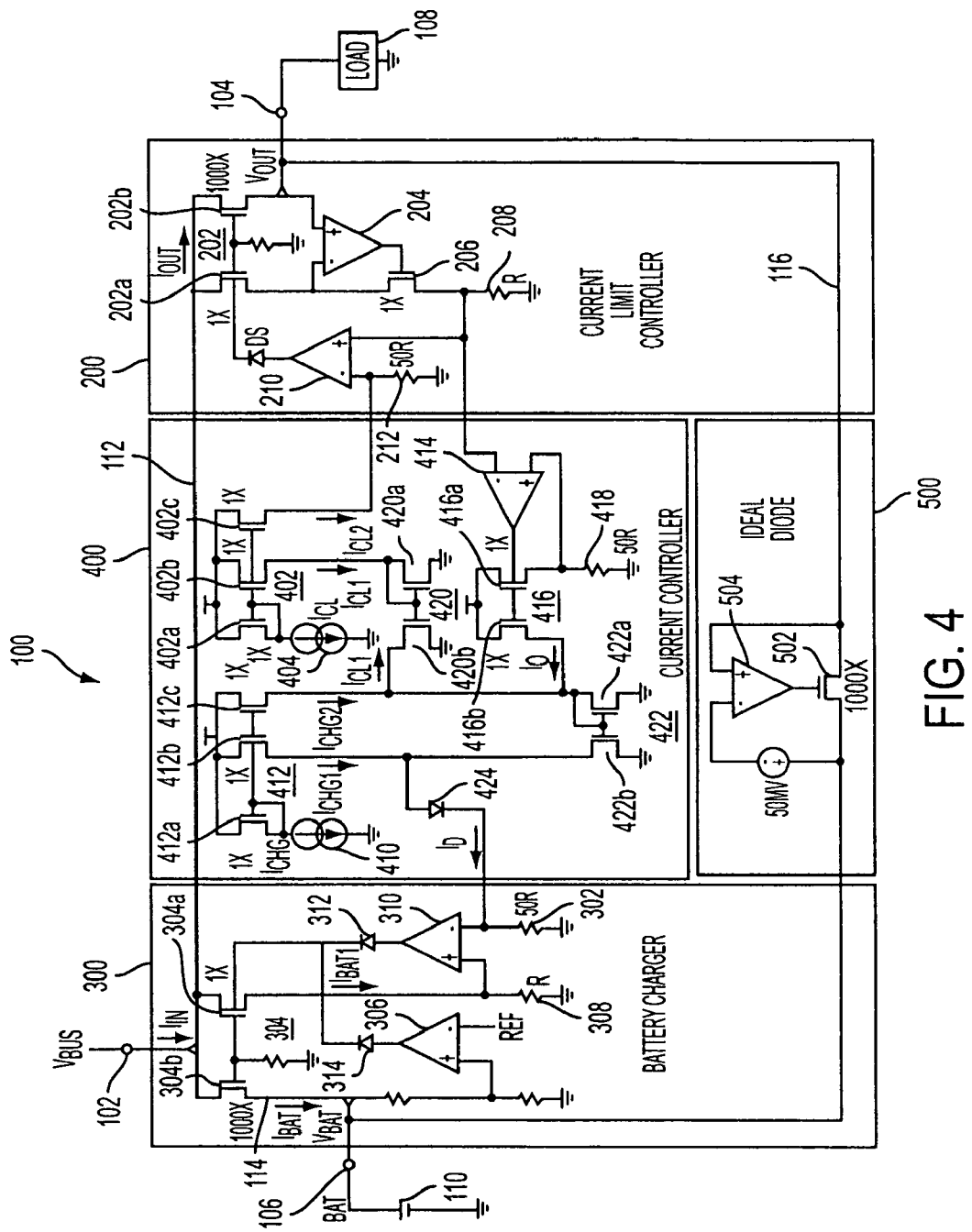
FIG. 4 is an exemplary configuration of current control circuitry implementing the current control shown in FIG. 3.

FIG. 4 illustrates an exemplary configuration of current control circuitry implementing the current control shown in FIG. 3. As described in FIG. 2, current control circuitry 100 shown in FIG. 4 may be configured for providing power to load 108 through two different circuit paths. One path is a circuit path 112 from an input terminal 102 to an output terminal 104. Another path is a circuit path 116 from a battery terminal 106 to output terminal 104.

It is noted that FIG. 4 does not illustrate the topology for receiving power from wall adapter AC for brevity. However, it will be appreciated by persons skilled in the art that the topology shown in FIG. 4 may easily be modified to receive power from wall adapter AC, as shown in FIG. 2.

Current control circuitry 100 may comprise a current limit controller 200, battery charger 300, current controller 400, and ideal diode 500. Current limit controller 200 may be configured for limiting current on circuit path 112 within programmed current limit $I_{CL}$ (see FIG. 3) by measuring output current $I_{OUT}$ to load 108. Battery charger 200 is configured for controlling battery charge current $I_{BAT}$ to battery 110 based on current limit $I_{CL}$ and measured load current $I_{OUT}$. Current limit $I_{CL}$ and battery charge current $I_{CHG}$ can be programmed by, for example, external resistors, respectively. Current controller 400 may generate current limit $I_{CL}$ and programmed battery charge current $I_{CHG}$, as described below. It will be appreciated by persons skilled in the art that current limit $I_{CL}$ and programmed battery charge current $I_{CHG}$ in FIG. 4 are scaled down current as compared with current actually supplied to load 108 and battery 106. Accordingly, in FIG. 4, current limit $I_{CL}$ is used as a reference current for limiting output current $I_{OUT}$ (input current $I_{IN}$ to circuitry 100) when USB source $V_{BUS}$ is supplying power to the circuit, while programmed battery charge current $I_{CHG}$ is also used as a reference current for controlling battery charge current $I_{BAT}$ when either USB source $V_{BUS}$ or wall adapter AC is supplying power to the circuit.

Current controller 400 also controls battery charger 300 based on the measured output current $I_{OUT}$ and programmed current limit $I_{CL}$ such that battery charge current $I_{BAT}$ is controlled to maintain the sum of output current $I_{OUT}$ and the battery charge current is within programmed current limit $I_{CL}$. Ideal diode 500, as explained above, is preferably configured for providing power from battery 110 to load 108 when output voltage $V_{OUT}$ drops below battery voltage $V_{BAT}$. Ideal diode 500 can also prevent reverse conduction onto battery 110 that could over-charge the battery.

In current controller 400, a current source 404 is programmed to generate current limit $I_{CL}$. The term "programmed," throughout this disclosure, is meant predetermined in current magnitude by a designer. Current controller 400 includes a current mirror 402 including transistors 402a, 402b, 402c. Current mirror 402 generates output currents $I_{CL1}$ and $I_{CL2}$ equivalent to programmed current limit $I_{CL}$ from transistors 402b, 402c, respectively. Copy current limit $I_{CL2}$ is provided to current limit controller 200 where current limit $I_{CL2}$ is applied to a ground referenced resistor 212 that sets up a reference voltage for the current limit controller to limit output current $I_{OUT}$ (input current $I_{IN}$) within current limit $I_{CL}$.

Current limit controller 200 comprises a current mirror 202 including transistors 202a and 202b sized to conduct currents respectively of 1/1000 ratio, with the drain of transistor 202a connected to the inverting input of amplifier 204 and to the source of transistor 206. The drain of transistor 202b is connected to the non-inverting input of the amplifier and to output terminal 104. The gate of transistor 206 is controlled by the output of amplifier 204 to ensure that the drain voltages of transistors 202a, 202b are equal, thereby minimizing output impedance mismatch errors in those transistors. The drain of transistor 206 is connected to a ground through resistor 208.

Transistor 202b is a large power device and transistor 202b is a scaled down version of the power device which is designed to act as a sense device for sensing output current $I_{OUT}$ (or for measurement of output current $I_{OUT}$). The current through transistor 202a is presented to resistor 208, at which a voltage is generated and applied to the positive input of an amplifier 210. This voltage is proportional to output current $I_{OUT}$. To the negative input of amplifier 210, the reference voltage generated by current limit $I_{CL2}$ at resistor 212 is applied. Amplifier 210 compares those voltages and amplifies a difference between them for servoing a gate voltage of transistors 202a and 202b. If current though transistor 202a (sense device) becomes larger and the voltage generated by that current begins to exceed the reference voltage corresponding to current $I_{CL2}$, the servo loop will decrease the gate voltage of transistors 202a and 202b. Accordingly, transistor 202b (power device) can maintain output current $I_{OUT}$ constant, i.e., limit output current $I_{OUT}$ (or input current $I_{IN}$) within current limit $I_{CL}$.

Returning to explanation of current controller 400, the controller is provided with the voltage corresponding to output current $I_{OUT}$ from resistor 208 of current limit controller 200. That voltage is used to control the gates of transistors 416a, 416b constituting a current mirror 416. Current mirror 416 is provided for generating current $I_O$ proportional to output current $I_{OUT}$. The drain of transistor 416a is connected to a grounded resistor 418 where a reference voltage is generated to servo a gate voltage of the transistors. The voltage generated at resistor 418 is provided to the positive input of amplifier 414 and the voltage generated at resistor 208 is provided to the negative input of the amplifier. Amplifier 414 compares those voltages to control the gate voltage of transistors 416a, 416b.

Battery charge current $I_{BAT}$ to battery 110 can be programmed by, for example, an external resistor. In current controller 400, a current source 410 is programmed to generate programmed battery charge current $I_{CHG}$ for generating battery charge current $I_{BAT}$. This programmed battery charge current $I_{CHG}$ can be set independent of current limit $I_{CL}$, which can be greater or smaller than current limit $I_{CL}$ in magnitude (see FIG. 3). Current controller 400 includes a current mirror 412 having transistors 412a, 412b, 412c. Transistors 412b, 412c output copy currents $I_{CHG1}$ and $I_{CHG2}$ equivalent to programmed battery charge current $I_{CHG}$.

Current $I_O$ from transistor 416b is summed together with programmed battery charge current $I_{CHG2}$. Current limit $I_{CL1}$, which is a copy of current limit $I_{CL}$, is subtracted from the sum of current $I_{CHG2}$ and current $I_O$ by a current mirror 420 having transistors 420a, 420b. The resulting current $(I_{CHG2}+I_O-I_{CL1})$ is mirrored by transistors 422a, 422b constituting a current mirror 422 and subtracted from the other programmed battery charge current $I_{CHG1}$. The remaining current $I_D= (I_{CHG1}-(I_{CHG2}+I_O-I_{CL1}))$ then flows through diode 424 and is used as a reference to set battery charge current $I_{BAT}$ in battery charger 300.

Current $I_D$ is applied to a ground referenced resistor 302 of battery charger 300 that sets up a reference voltage for the battery charger to control battery charge current $I_{BAT}$. Battery charger 300 comprises a current mirror 304 having transistors 304a and 304b sized to conduct currents respectively of ratio 1/1000 for this example. Transistor 304b may be a large power device and transistor 304a may be a scaled down version of the power device acting as a sense device for sensing battery current $I_{BAT}$ flowing from transistor 304b to battery 110. The drain of transistor 304b is coupled to battery 110 through circuit path 114 for charging the battery and to the non-inverting input of an amplifier 306. To the negative input of amplifier 306 is applied a reference voltage REF, corresponding to the fully charged terminal voltage of battery 110. For example, a lithium-ion battery has a fully charged terminal voltage of 4.2V. Amplifier 306 is a voltage control amplifier for controlling the gate voltage of transistors 304a, 304b through a diode 314, thereby reducing battery charge current $I_{BAT}$ once battery voltage $V_{BAT}$ reaches a fully charged terminal voltage of, for example, 4.2V.

The drain of transistor 304a is connected to a grounded resistor 308 to which the sensed battery charge current $I_{BAT}$ is supplied. A voltage generated by that sensed current at resistor 308 is applied to the positive input of an amplifier 310. To the negative input of the amplifier, the reference voltage corresponding to current $I_D$ is applied. Resistors 302 and 308 have a ratio at 50:1 in this example. Amplifier 310 compares those voltages and applies an amplified difference between them to the gates of transistors 304a, 304b to control magnitude of battery charge current $I_{BAT}$. In more detail, amplifier 310 pulls up or down the gate voltage of transistors 304a, 304b through a diode 312 until the voltage across resistor 308 becomes equal to that across resistor 302.

Current $I_D$ is proportional to battery charge current $I_{BAT}$.

$$I_D = I_{CHG1} - (I_{CHG2} + I_O - I_{CL1}) \propto I_{BAT}$$

If $I_{CHG1} = I_{CHG2}$, $I_{CHG} > I_{CL} - I_O$ and $I_{CL} = I_{CL1}$, then
$$I_D = (I_{CL} - I_O)$$

If $I_D$ is proportional to $I_{BAT}$, $I_O$ is proportional to $I_{OUT}$ and $I_N = I_{BAT} + I_O$, then $$I_{IN} = I_{BAT} + I_O \propto (I_{CL} - I_O) + I_O \propto I_{CL}$$

In other words, current controller 400 may mathematically perform the following processing to control battery charge current $I_{BAT}$ such that the sum of output current $I_{OUT}$ and battery charge current $I_{BAT}$ is within in current limit $I_{CL}$.

If $I_{CL} - I_{OUT} < I_{CHG}$, $I_{BAT} = I_{CL} - I_{OUT}$

If $I_{CL} - I_{OUT} \geq I_{CHG}$, $I_{BAT} = I_{CHG}$

Based on the above condition when $I_{CL} - I_{OUT} > I_{BAT}$, battery charger 300 controls magnitude of battery charge current $I_{BAT}$ such that the total input current $I_{IN}$ appears to be limited and independent of output current $I_{OUT}$ at output terminal 104.

Further, circuit path 116 is used to provide power to load 108. In this embodiment, this path may approximate an ideal diode in that a forward voltage is much lower than either a Schottkey diode or standard diode. This low forward drop allows for much greater efficiency and therefore longer battery life than standard diode. Ideal diode 500 may comprise a PMOS power device 502 connected between battery terminal 106 and output terminal 104. The gate of device 502 is controlled by an amplifier 504 configured to regulate a voltage across PMOS power device 502 to 50 mV.

In operation, current control circuitry 100 enables simultaneous powering of load 108 and charging of battery 110 from USB supply $V_{BUS}$ with input current limit $I_{CL}$ limited by current limit controller 200. Current limit controller 200 senses and measures output current $I_{OUT}$ by transistor 202a and resistor 208. If comparison of the measured current and current limit $I_{CL}$ reveals that output current $I_{OUT}$ exceeds current limit $I_{CL}$, current limit controller 200 then controls the gate voltage of transistors 202a, 202b to limit output current $I_{OUT}$ within magnitude defined by current limit $I_{CL}$. With such current limit operation, output voltage $V_{OUT}$ may drop. When output voltage $V_{OUT}$ drops below battery voltage $V_{BAT}$, ideal diode 500 then starts conducting power from battery 110 to load 104 to prevent output voltage $V_{OUT}$ from dropping below the battery voltage.

Current controller 400 receives a reference voltage generated from measured output current $I_{OUT}$ and generates current $I_O$ proportional to output current $I_{OUT}$. If current limit $I_{CL}$ minus curren$I_O$ is less than programmed battery charge current $I_{CHG}$, current controller 400 provides reference current $I_D$ to battery charger 300 such that battery charge current $I_{BAT}$ becomes equal to $I_{CL} - I_{OUT}$. Reference current $I_D$ is proportional to battery charge current $I_{BAT}$. On the other hand, if current limit $I_{CL}$ minus output current $I_{OUT}$ is not less than battery charge current $I_{CHG}$, battery charger 300 controls battery charge current $I_{BAT}$ so that actual battery charge current $I_{BAT}$ has magnitude defined by programmed battery charge current $I_{CHG}$.

If wall adaptor AC is connected to a USB device, current limit controller 200 may be disabled. Therefore, battery charger 300 outputs battery charge current $I_{BAT}$ having magnitude defined by programmed battery charge current $I_{CHG}$ (see FIG. 3) even though programmed battery charge current $I_{CHG}$ is greater than current limit $I_{CL}$ in magnitude.

When wall adaptor AC is not connected and assuming that current limit $I_{CL}$ is 500 mA, and programmed battery charge current 300 mA. When output current $I_{OUT}$ to load 108 measured is 300 mA, actual charge current $I_{BAT}$ becomes 200 mA (because if $I_{CL} - I_{OUT} < I_{CHG}$, $I_{BAT} = I_{CL} - I_{OUT}$). When output current $I_{OUT}$ to load 108 measured is 100 mA, charge current $I_{BAT}$ becomes 300 mA (because if $I_{CL} - I_{OUT} \geq I_{CHG}$, $I_{BAT} = I_{CHG}$). When presence of wall adaptor AC is detected, battery charge current $I_{BAT}$ will be 300 mA which is equal to program battery charge current $I_{CHG}$.

On other hand, assuming that current limit $I_{CL}$ is 200 mA, and programmed battery charge current 500 mA. When output current $I_{OUT}$ to load 108 measured is 150 mA, actual charge current $I_{BAT}$ becomes 50 mA (because if $I_{CL} - I_{OUT} < I_{CHG}$, $I_{BAT} = I_{CL} - I_{OUT}$). When output current $I_{OUT}$ to load 108 measured is zero, charge current $I_{BAT}$ becomes 200 mA (because if $I_{CL} - I_{OUT} < I_{CHG}$, $I_{BAT} = I_{CL} - I_{OUT}$) When presence of wall adaptor AC is detected, battery charge current $I_{BAT}$ will be 500 mA which is equal to program battery charge current $I_{CHG}$ because program battery charge current $I_{CHG}$ takes over current limit $I_{CL}$.

When input power, such as USB supply $V_{BUS}$ or wall adapter AC, is removed from the USB device, output voltage $V_{OUT}$ will drop below battery voltage $V_{BAT}$. Then, ideal diode 500 is enabled and the forward conduction of the diode prevents output voltage $V_{OUT}$ from dropping below battery voltage $V_{BAT}$.

Having described embodiments, it is noted that modifications and variations can be made by persons skilled in the art in light of the above teachings. It is therefore to be understood that changes may be made in the particular embodiments disclosed that are within the scope and sprit of the disclosure as defined by the appended claims and equivalents.

What is claimed is:

1. Current control circuitry for controlling current supplied to a load and a battery from a source external to the battery, the circuitry comprising: a current limit control circuit configured for limiting current to the load from the source within a programmed current limit; a load current measurement circuit configured for measuring the load current from the source; and an input charger control circuit coupled to the load current measurement circuit and configured for controlling magnitude of current to the battery as a function of the measured load current so that the sum of the load current and the battery current is within the programmed current limit; and wherein the source is a universal serial bus (USB) power supply, and the load and battery constitute a USB powered device.

2. The current control circuitry according to claim 1, wherein the input charger control circuit configured for controlling the magnitude of the battery current based on the measured load current and programmed battery current setting maximum battery current.

3. The current control circuitry according to claim 2, wherein
the source is a limited current capacity source,
the programmed current limit is determined according to the limited current source's capacity to supply current, and
the programmed battery current is determined according to the battery's charge rate.

4. The current control circuitry according to claim 2, wherein
the input charger control circuit is configured for determining a difference between the programmed current limit and the measured load current, and in response reducing the battery current when the difference is less than the programmed battery current.

5. The current control circuitry according to claim 4, wherein
for obtaining the difference, the input charge control circuit is configured for subtracting the programmed current limit from the sum of the measured load current and the programmed battery current, and subtracting the result of the subtraction from the programmed battery current.

6. The current control circuitry according to claim 4, wherein
the input charger control circuit is configured for supplying to the battery the battery current having magnitude corresponding to the programmed battery current when the difference is not less than the programmed battery current magnitude.

7. The current control circuitry according to claim 1, further comprising
a battery voltage monitoring circuit configured for monitoring a voltage of the battery, and reducing the battery current when the battery voltage reaches a predetermined voltage.

8. The current control circuitry according to claim 1, further comprising
a load voltage monitoring circuit configured for monitoring a voltage of the load and a voltage of the battery, and enabling the battery to provide current to the load when the load voltage drops below the battery voltage.

9. The current control circuitry according to claim 2, further comprising
a detector for detecting presence of an additional source for supplying current to the load and battery, wherein
the load current limit circuit is further configured for turning off the load current from the source and the battery current control circuit is further configured for turning off the battery current from the source when the presence of the additional source is detected, for allowing the additional source to supply the current to the load and battery.

10. The current control circuitry according to claim 9, wherein
the input charger control circuit is further configured for supplying the battery current having magnitude corresponding to the programmed battery current when the presence of the additional source is detected.

11. The current control circuitry according to claim 10, wherein the programmed battery current is set to be different from the programmed current limit in magnitude.

12. The circuitry according to claim 1, further comprising
a circuit path interconnecting the source and load, wherein
the battery is connected to the circuit path through the input charger control circuit to avoid a battery voltage from dictating a voltage on the circuit path.

13. Current control circuitry for controlling current supplied to a load and a battery from a source external to the battery, the circuitry comprising:
a current limit control circuit configured for limiting current to the load from the source within a programmed current limit;
a load current measurement circuit configured for measuring the load current from the source; and
an input charger control circuit configured for controlling current to the battery from the source based on programmed magnitude for the battery charge current and the measured load current magnitude, wherein
when the source is a current constrained source whose capacity of supplying current is limited, the input charger control circuit controls magnitude of the battery charge current based on the measured load current so that the sum of the load current and the battery current is within the programmed current limit, and
when the source is not such a current constrained source, the input charger control circuit provides to the battery the battery charge current having magnitude equivalent to the programmed magnitude.

* * * * *